(12) United States Patent
Khlat et al.

(10) Patent No.: US 8,787,215 B1
(45) Date of Patent: Jul. 22, 2014

(54) COMBINED SWITCH AND RECEIVE TUNER FOR ENHANCED LTE-TDD SYSTEM

(75) Inventors: Nadim Khlat, Midi-Pyrenees (FR); Marcus Granger-Jones, Scotts Valley, CA (US)

(73) Assignee: RF Micro Devices, Inc., Greensboro, NC (US)

( * ) Notice: Subject to any disclaimer, the term of this patent is extended or adjusted under 35 U.S.C. 154(b) by 695 days.

(21) Appl. No.: 12/900,056

(22) Filed: Oct. 7, 2010

Related U.S. Application Data

(60) Provisional application No. 61/249,538, filed on Oct. 7, 2009.

(51) Int. Cl.
*H04J 3/00* (2006.01)

(52) U.S. Cl.
USPC ............ 370/280; 370/294; 370/328; 370/345

(58) Field of Classification Search
USPC .......................................................... 455/75
See application file for complete search history.

(56) References Cited

U.S. PATENT DOCUMENTS

| | | | |
|---|---|---|---|
| 7,634,243 B1* | 12/2009 | Esquivel et al. | ............... 455/209 |
| 2007/0149145 A1* | 6/2007 | Chang et al. | ..................... 455/78 |
| 2007/0194859 A1* | 8/2007 | Brobston et al. | ............. 333/17.3 |
| 2009/0028109 A1* | 1/2009 | Huang et al. | ................... 370/330 |
| 2009/0180403 A1* | 7/2009 | Tudosoiu | ....................... 370/278 |
| 2011/0014879 A1* | 1/2011 | Alberth et al. | ................... 455/75 |
| 2011/0053646 A1* | 3/2011 | Kundmann et al. | ........ 455/562.1 |

* cited by examiner

*Primary Examiner* — Hassan Kizou
*Assistant Examiner* — Toan Nguyen
(74) *Attorney, Agent, or Firm* — Withrow & Terranova, P.L.L.C.

(57) ABSTRACT

An antenna tuner unit (ATU) that includes a T/R switch integrated with a receive only tuner circuit that is made up of a relatively tiny tuner circuitry is provided. The integration of the T/R switch with the receive only tuner circuit uses a microelectronics fabrication technology like silicon-on-insulator (SOI) with minimum cascading stages. As a result, the ATU of the present invention avoids a relatively complicated and expensive technology like Micro-electromechanical systems (MEMS). The ATU of the present disclosure is applicable to fourth generation (4G) standards like long term evolution time division duplex (LTE-TDD) or for a receiver diversity system such as a multiple-input and multiple-output (MIMO) system. The control of the receive only tuner circuit is accomplished via a relatively simple one-wire general input output (GPIO) thus allowing interface with most existing or future 4G transceiver products.

41 Claims, 16 Drawing Sheets

COMBINED SWITCH AND RECEIVE TUNER FOR ENHANCED LTE-TDD SYSTEM

RELATED APPLICATIONS

This application claims the benefit of provisional patent application Ser. No. 61/249,538, filed Oct. 7, 2009, the disclosure of which is hereby incorporated herein by reference in its entirety.

FIELD OF THE DISCLOSURE

The present disclosure relates to an antenna tuner unit (ATU) having a receive only tuner circuit that is integrated with a transmit/receive (T/R) switch. In particular, the present disclosure provides a relatively tiny ATU for increasing total isotropic sensitivity (TIS) for power ranges below +0 dBm.

BACKGROUND

Antenna tuner units (ATU) are currently being considered for use in mobile terminals used for mobile radio communications. One purpose of an ATU is to match the impedance between a power amplifier (PA) and an antenna, thereby maximizing total radiated power (TRP). Another purpose of an ATU is to increase reception of radio signals by maximizing total isotropic sensitivity (TIS) for the antenna, especially since the antenna can experience large voltage standing wave ratio (VSWR) changes. For example, an antenna's input impedance is one parameter that can be affected by changes in a user's body placement versus the antenna. Certain body placements relative to the antenna will result in decreased radiated power due to a relatively large amount of power being reflected off the user's body, thus limiting the antenna's TRP. When the antenna is used for signal reception, other body placements relative to the antenna will reduce the TIS, resulting in poor receiver performance.

Presently, ATUs for cellular applications or mobile Internet devices (MIDs) that use third generation (3G) or fourth generation (4G) cellular systems are dual purpose ATUs. These ATUs are dual purpose in that they are used for impedance matching in both a transmit path and a receive path between a transceiver interface and a communicatively coupled antenna. These dual purpose ATUs require tuning elements that can handle large voltages due to the relatively large transmit powers involved. For example, dual purpose ATUs must be able to withstand a 6:1 VSWR. At a +33 dBm output power radiated from an antenna, a 6:1 VSWR requires a peak-to-peak voltage of 70Vpk-pk. Micro-electromechanical systems (MEMS) switches having a large voltage drive have been developed to handle such large voltages. A disadvantage of MEMS switches is cost. Solid state switches using silicon-on-sapphire (SOS) or silicon-on-insulator (SOI) can also be used to handle large peak-to-peak voltages. However, at least fourteen cascode switches per switch branch must be used in order to handle 70Vpk-pk. Thus, a die size for dual purpose ATUs must be relatively large, on the order of 3 mm². Due to such a relatively large die size, SOI technology may be required, which further increases cost. In a further complication, dual purpose ATUs in some cases requires coupling and detector circuitries to calculate optimum tuning settings.

ATUs are presently being considered for MIDs in order to enhance the TRP/TIS of mobile terminals for the purpose of providing better high speed data operation. However, presently considered ATUs are designed to adjust impedance matching between an antenna and a radio interface to provide tuning for both a transmitter circuit and a receiver circuit. Thus, due to the large transmitter power, a relatively expensive dual purpose ATU solution is most often deemed necessary. However, a user usually operates a mobile terminal in a high speed data downlink mode. Moreover, with the advent of 4G mobile terminals like long term evolution time division duplex (LTE-TDD), which have higher modulation bandwidth and higher downlink data rates, the quality of downlink performance is critical. As a result, improvements in TIS are more critical than improvements in TRP. Therefore, what is needed is an ATU that includes a receive only tuner circuit for a mobile terminal that has increased TIS along with reduced cost of implementation.

SUMMARY

The present disclosure provides an antenna tuner unit (ATU) that includes a transmit/receive (T/R) switch integrated with a receive only tuner circuit that comprises a relatively tiny tuner circuitry since the ATU handles a low power range (below +0 dBm). The integration of the T/R switch with the receive only tuner circuit uses a microelectronics fabrication technology like silicon-on-insulator (SOI) with minimum cascading stages. As a result, the ATU of the present invention avoids a relatively complicated and expensive technology like micro-electromechanical systems (MEMS). The ATU of the present disclosure is applicable to fourth generation (4G) standards like long term evolution time division duplex (LTE-TDD) or to a diversity receiver such as a multiple-input and multiple-output (MIMO) system. The ATU of the present disclosure enables improved sensitivity under voltage standing wave ratio (VSWR) for better usage data rate reception. As a result, a link budget between a mobile terminal incorporating the ATU and a base station is improved. A mobile terminal based on the present ATU would also enhance time division duplex (TDD) reception for future satellite based cellular networks. The control of the receive only tuner circuit is accomplished via a relatively simple one-wire general purpose input output (GPIO), thus allowing an interface with most existing or future 4G transceiver products.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
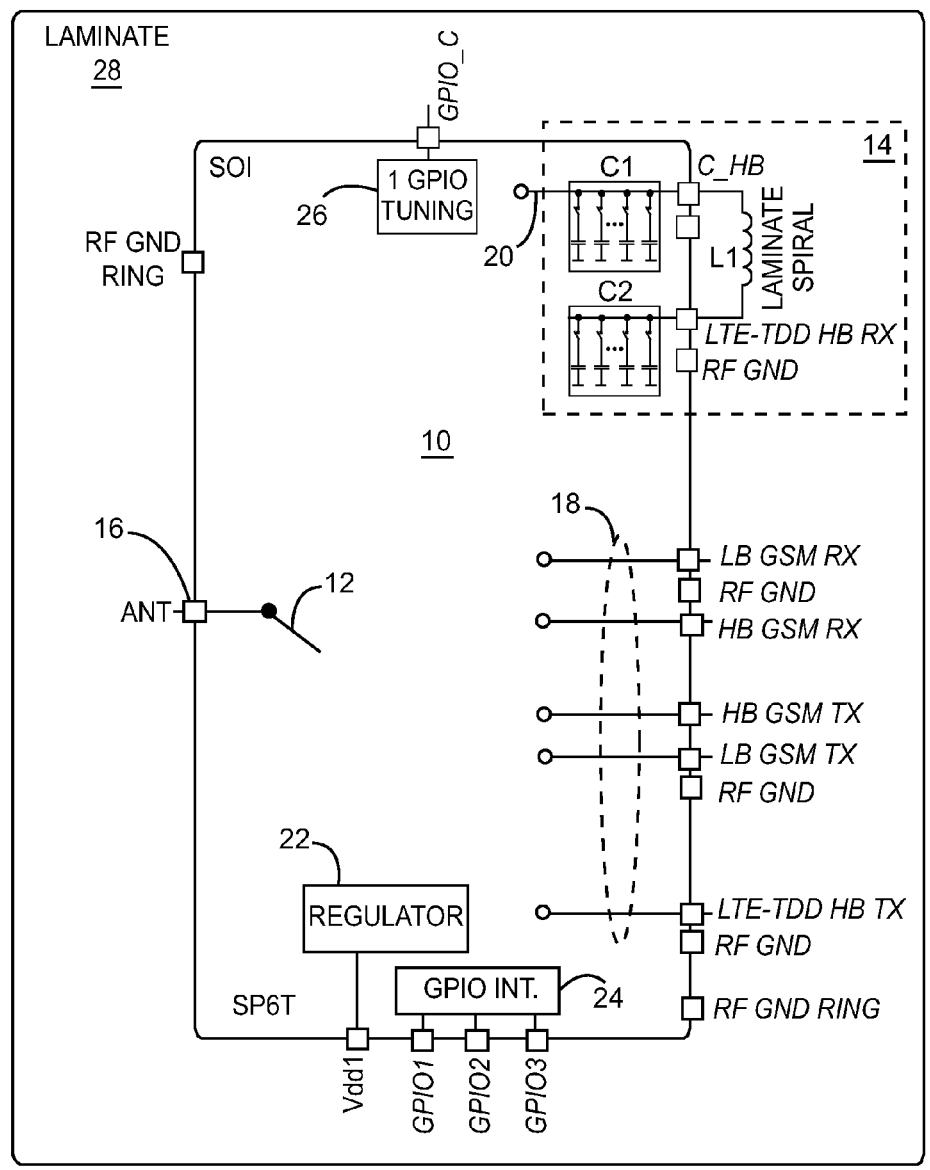
FIG. 1 depicts an antenna tuner unit (ATU) having a transmit/receive (T/R) switch integrated with a receive only tuner circuit according to the present disclosure.

FIG. 1 depicts an antenna tuner unit (ATU) 10 having a transmit/receive (T/R) switch 12 integrated with a receive only tuner circuit 14 according to the present disclosure. The T/R switch 12 preferably includes an antenna input 16, a plurality of switch throws 18 and a receive (RX) throw 20. The T/R switch 12 also preferably includes a voltage regulator 22 for powering the ATU 10, and a general purpose input output (GPIO) 24 for controlling the switch position of T/R switch 12. The ATU 10 also includes a one-wire GPIO tuning interface 26 for selecting capacitor elements of a switchable capacitor C1 and a switchable capacitor C2 that comprise the receive only tuner circuit 14. The control of the receive only tuner circuit 14 is accomplished via the one-wire GPIO tuning interface 26, which avoids the need to have a multi-wire serial interface (i.e. two-wire or three-wire interface) due to the simplicity of programming a plurality of capacitor-array control bits, since the capacitor C1 and the capacitor C2 typically do not exceed 6 bits each. Details of the GPIO programming are outlined further below.

The ATU 10 is preferably constructed using a silicon-on-insulator process (SOI) that is placed on a laminate 28. A circuit topology for the receive only tuner circuit 14 can be PI network based or T network based or based on another network that is optimized for a given band coverage. FIG. 1 depicts a PI network in which the capacitors C1 and C2 are each made up of a two capacitor-array with an inductor L1 coupled between the capacitors C1 and C2. Preferably, the inductor L1 is a laminate spiral printed on the laminate 28 in order to avoid using surface mount device (SMD) components for cost reasons. The inductor L1 could be also located on an SOI die of the ATU 10 by using a four metal layer (4MD) back-end metal process with two thick metal layers to build high quality (Q) inductors directly on the SOI die. As a result of the circuit topology shown in FIG. 1, the linearity requirements of the receive only tuner circuit 14 are reduced for a second harmonic intermodulation distortion (IM2) and a third harmonic intermodulation distortion (IM3) due to lower power blocker level signals during time division duplex (TDD) operation.

The combination of the T/R switch 12 and the receive only tuner circuit 14 takes advantage of asymmetrical data requirements between a mobile terminal (not shown) that incorporates the ATU 10 and a base station (not shown) that sends relatively more data to the mobile terminal than the base station receives from the mobile terminal. An example of an asymmetrical data application would be downloading a video stream from the base station.

Since the ATU 10 is only used to receive data, the receive only tuner circuit 14 is not required to handle a large voltage. This reduced requirement for handling voltage allows integration of the T/R switch 12 with the receive only tuner circuit 14, which maximizes a reuse of overhead circuitries like switch drivers, control logic and programming. The combination of the T/R switch 12 and the receive only tuner circuit 14 provides a low-cost solution for an antenna tuner system for half-duplex and TDD systems. For example, a long term evolution time division duplex (LTE-TDD) system does not operate a receiver and transmitter simultaneously. Therefore, LTE-TDD systems are ideal candidates for implementations of the ATU 10. Since the receive only tuner circuit 14 is coupled to the RX throw 20 in an RX only path, the receive only tuner circuit 14 is relatively isolated from large transmitter voltages. Moreover, the combination of the receive only tuner circuit 14 with the T/R switch 12 for LTE-TDD systems offers a relatively inexpensive way to enhance receiver sensitivity by several decibels (dB). When the ATU 10 is used in a common non-50 ohm environment, capital expenditures (CAPEX) are reduced even while enhanced-sensitivity mobile terminals are realized.

The receive only tuner circuit 14 is typically exposed to a maximum on-channel signal power of −15 dBm, which is relatively low for a 6:1 voltage standing wave ratio (VSWR). In terms of voltage, the receive only tuner circuit 14 is exposed to about +280 mVpk-pk. As a result of this relatively low voltage, no cascode switch stages are required. However, a received signal at the antenna of a mobile terminal can be as high as +9 dBm if the mobile terminal includes external blockers such as those used for a wireless local area network (WLAN) emitter. The +9 dBm signal received at the antenna corresponds to a voltage signal of +4.5Vpk-pk, which is well within the voltage tolerance of a couple of field effect transistor (FET) switches.

Figure 2:
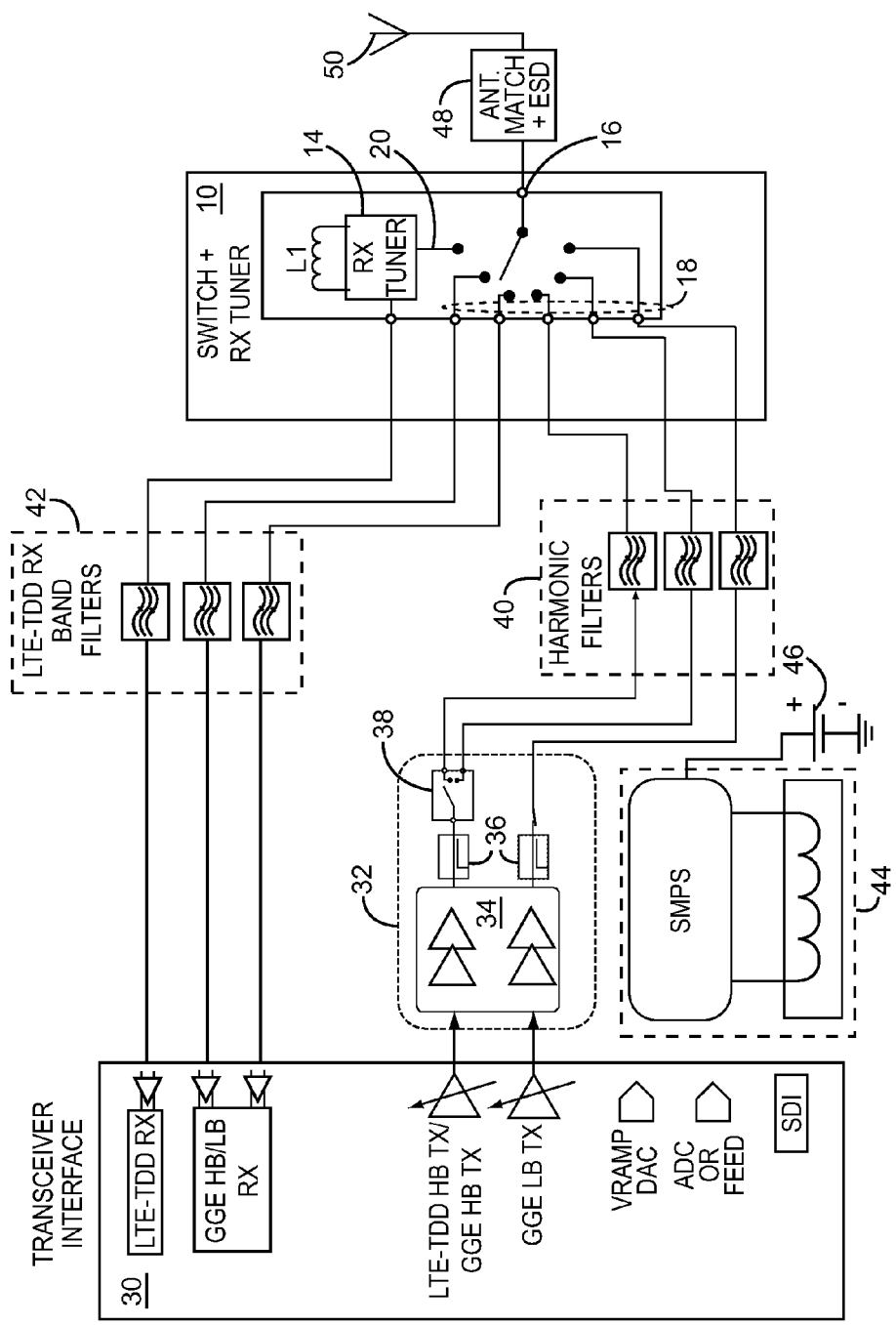
FIG. 2 is a block diagram of a transceiver interface that features the T/R switch integrated with the receive only tuner circuit according to the present disclosure.

FIG. 2 is a block diagram of a transceiver interface 30 that features the ATU 10 (FIG. 1) according to the present disclosure. In this case, the T/R switch 12 is a single pole six throw (SP6T) switch with the receive only tuner circuit 14 integrated with and communicatively coupled to the RX throw 20 of the T/R switch 12. A power amplifier (PA) circuitry 32 is coupled between the ATU 10 and the transceiver interface 30. The PA circuitry 32 includes PA stages 34 and may include directional couplers 36 and a transmitter (TX) switch 38. Harmonic filters 40 can be added between the PA circuitry 32 and the T/R switch 12. LTE-TDD RX band filters 42 can be added between the T/R switch 12 and the transceiver interface 30. A buck-boost switcher supply 44 is coupled to a battery 46 that provides power to the PA circuitry 32 and the transceiver interface 30. An antenna impedance matching network with electrostatic discharge protection 48 can be added between the ATU 10 and an antenna 50. The ATU 10 is sized to fit in a mobile terminal for LTE-TDD bands where a quad band Global System for Mobile Communications (GSM) is used with one LTE-TDD band located in the 2.1 GHz band.

Figure 3:
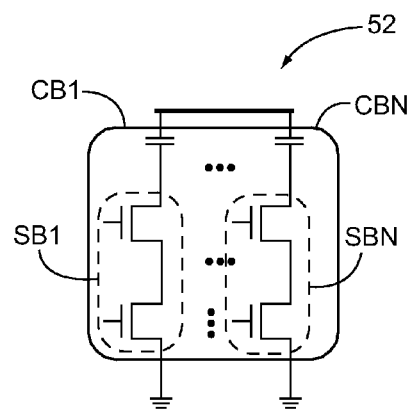
FIG. 3 depicts an RX only capacitor-array-type tuning element.

FIG. 3 depicts an RX only switchable capacitor-array 52 that is usable as a tuning element for the receive only tuner circuit 14. The RX only switchable capacitor-array 52 includes a plurality of capacitor elements CB1-CBN, wherein each of the plurality of capacitor elements CB1-CBN is switchable via FET switch branches SB1-SBN, wherein N is the number of FET switch branches. Notice that each of the FET switch branches SB1-SBN only includes two series FETs that are controlled by three tuning bits. A typical antenna tuner for a mobile terminal transmitter would be at least seven times larger due to higher voltage requirements that call for the use of fourteen FET elements for the same number of tuning bits.

Figure 4:
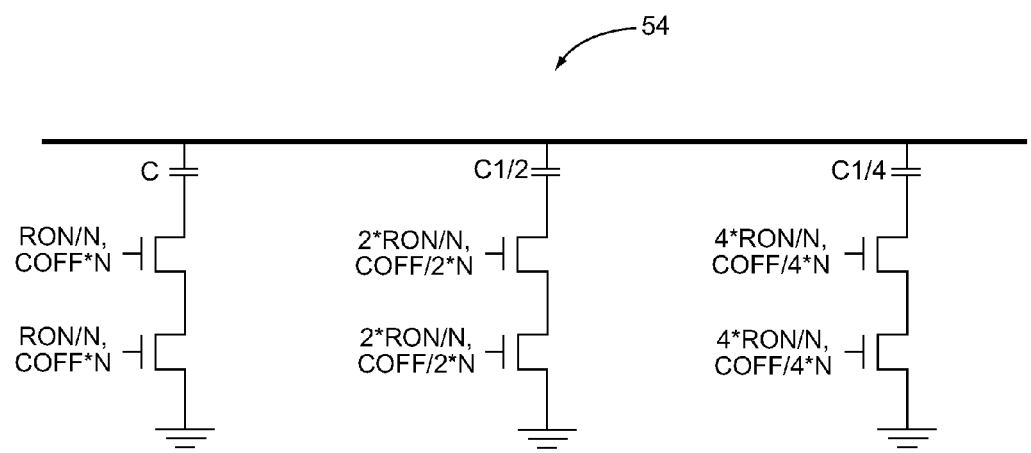
FIG. 4 depicts a binary segmented capacitor-array-type tuning element.

FIG. 4 depicts a segmented binary-weighted capacitor-array 54 with three bit tuning. The segmented binary-weighted capacitor-array 54 is also usable as a tuning element for the receive only tuner circuit 14. The segmented binary-weighted capacitor-array 54 has an advantage of increased resolution for the same number of tuning bits. The segmented binary-weighted capacitor-array 54 is usually constructed using a number of vertical capacitors that can handle a large voltage due to a potential electrostatic discharge (ESD).

Phase rotation due to transmission line equivalent inductance is reduced by placing the ATU 10 close to the antenna 50 (FIG. 2). Unlike a traditional antenna tuner, the receive only tuner circuit 14 does not require a coupler and power detector for proper operation. Instead, optimum values for the tuning bits for the receive only tuner circuit 14 are extracted from algorithms that are preferably processed with a mobile terminal's control system that includes a general processor unit (not shown) using information such as received signal strength indication (RSSI) and/or bit error rate (BER). Thus, the ATU 10 does not require a dedicated processor to execute any on-board algorithms. As a result of self-sufficiency, an addition of the ATU 10 is cost effective for existing mobile terminal designs. Moreover, an estimated area increase due to the addition of the receive only tuner circuit 14 on an existing SP6T switch such as T/R switch 12 is calculated to be ~0.17 mm$^2$ for a 0.3 mm$^2$ die.

Figure 5:
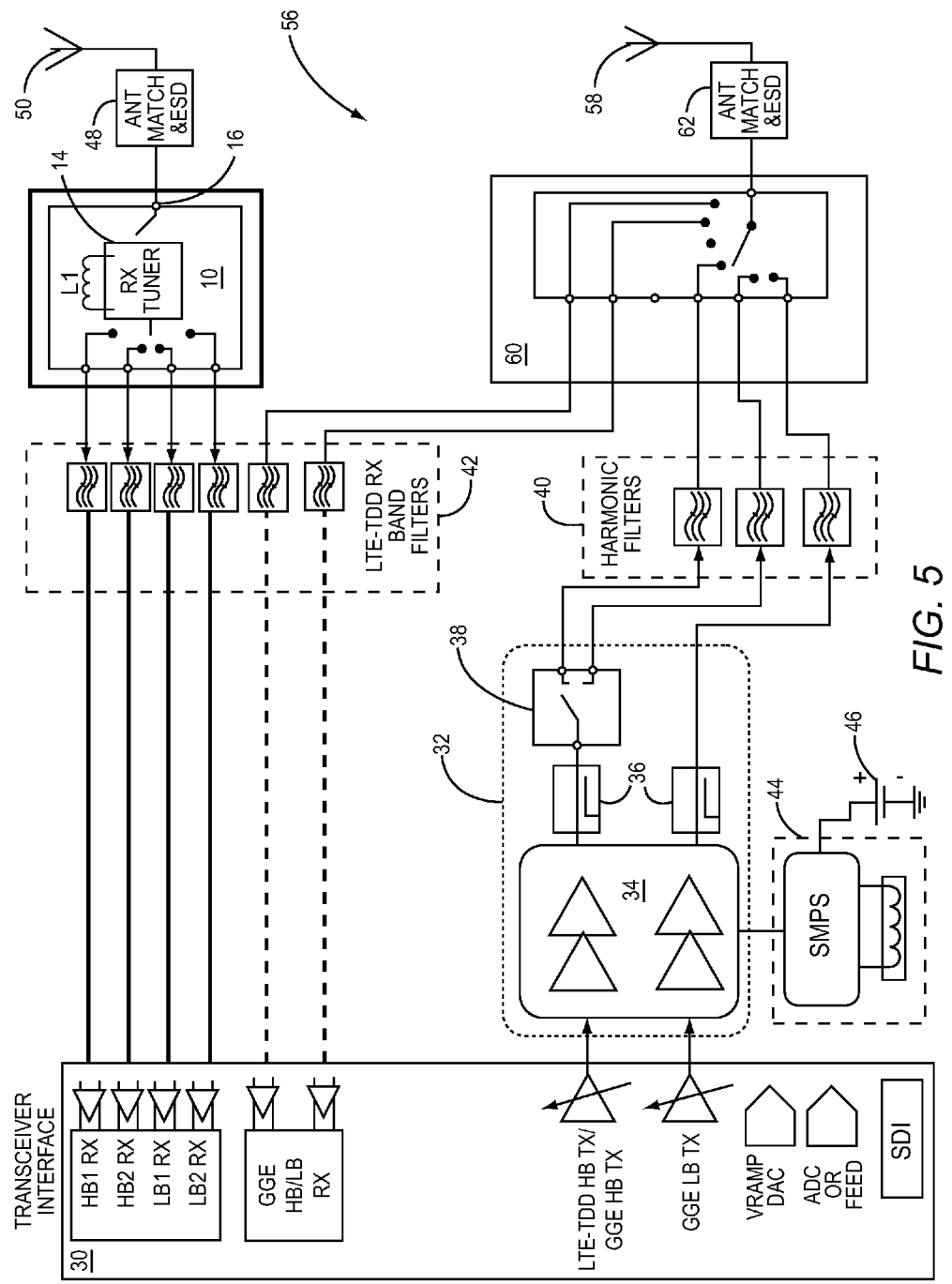
FIG. 5 is a block diagram of a transceiver interface that features a receive switch integrated with the receive only tuner circuit incorporated in a diversity or a multiple-input and multiple-output (MIMO) configuration.

As shown in FIG. 5, the ATU 10 can be used for tuning the antenna 50 in a diversity antenna system 56 wherein only one tuner is required for the transceiver interface 30. The diversity antenna system includes a separate TX/RX antenna 58 that is coupled to a TX/RX switch 60 through an antenna impedance matching network with an electrostatic discharge protector 62. As a result of the addition of the ATU 10 to the diversity antenna system 56, the antenna 50 will have enhanced performance over optimization of the transceiver interface 30 alone. However, due to the close proximity of the antenna 50 to the TX antenna 58, the receive only tuner 14 circuit may need to absorb a relatively large level of TX leakage power from the TX antenna 58. Calculations predict that this leakage power will be about +14 dBm, which is significantly lower than the +33 dBm that the receive only tuner circuit 14 would experience if the receive only tuner circuit 14 were integrated with the TX/RX switch 60. It is to be understood that the T/R switch 12 can be used as a receive only switch in the diversity antenna system 56.

Figure 6:
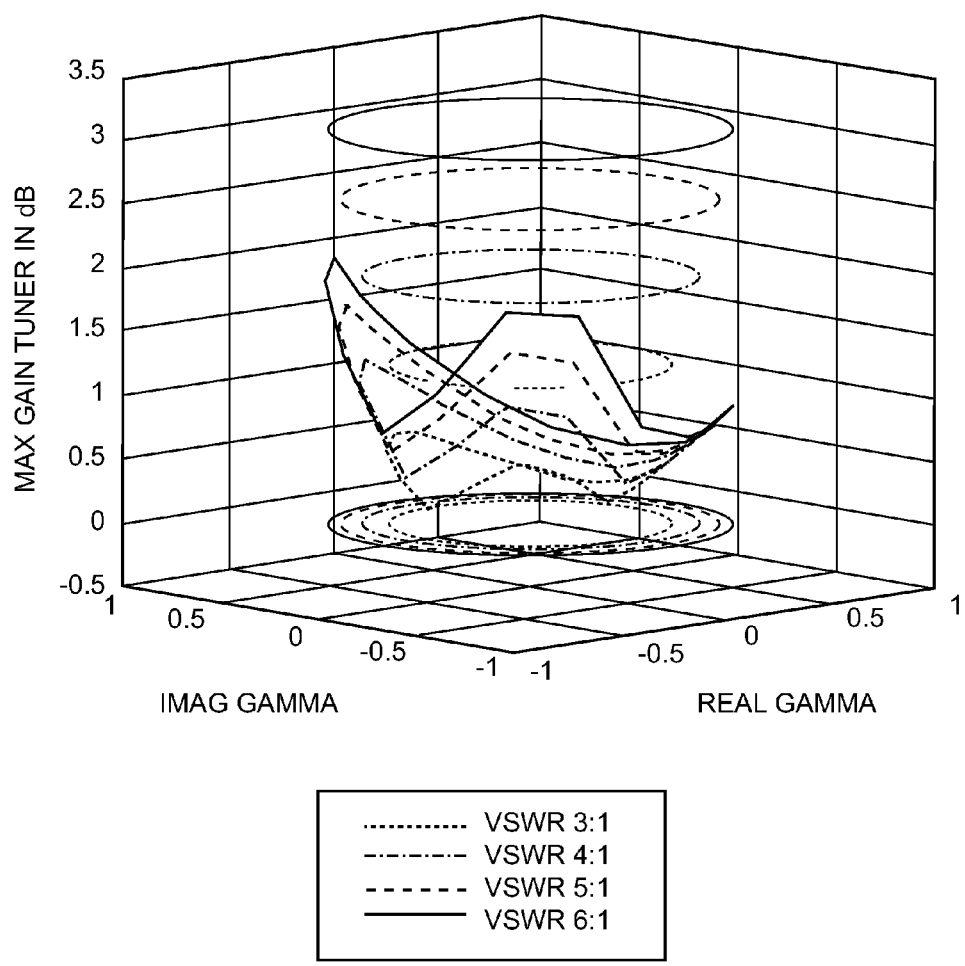
FIG. 6 is a three-dimensional graph of Maximum Tuner Gain in decibels (dB) versus the imaginary part of gamma and the real part of gamma.
Figure 7:
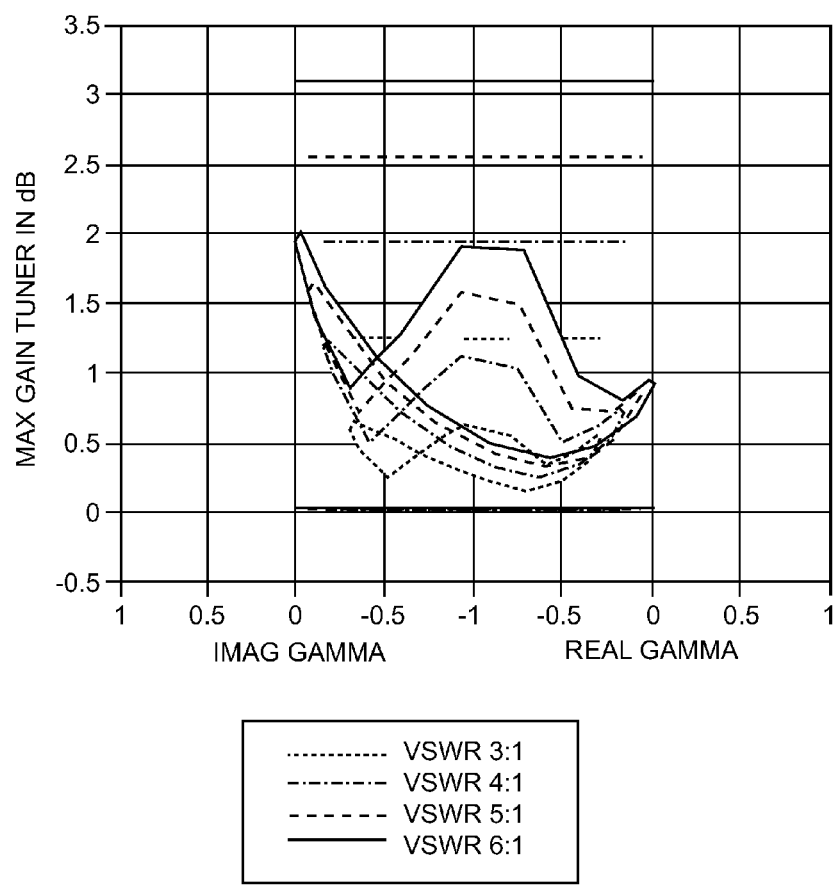
FIG. 7 is a two-dimensional graph of Maximum Tuner Gain in dB versus the imaginary part of gamma and the real part of gamma.

A system simulation is outlined below using one suggested RX tuning algorithm, and shows the convergence of the receive only tuner circuit 14 and its efficiency. The expected system performances using an SOI model and insertion loss are shown in FIGS. 6 and 7 for VSWRs of 3:1, 4:1, 5:1, and 6:1.

The control of the tuning elements of the receive only tuner circuit 14 is handled directly by a mobile terminal baseband processor (i.e., control system) or other incorporating device (not shown). A tuning algorithm using the following metrics is preferred:
    maximize the RSSI signal level as one metric, where the RSSI is measured by the mobile terminal baseband processor after the channel filtering;
    maximize the received signal channel power (RSCP) signal level;
    maximize the Signal to Noise and Interference ratio (SNIR); and
    minimize the Block Error Rate (BLER).
Since the processing of such an algorithm is executable via an external baseband processor, there is no need for a processor within the ATU 10. Moreover, the control of the tuning elements can be synchronized to a power control loop of a mobile terminal that adjusts the mobile transmit power requested by a base station. In this way, relatively small incremental changes in the RX tuning results in small changes in a received signal level. Therefore, a small step change in the TX power output is controlled by the network inner power control loop. Also, the small incremental changes in the RX tuning ensure that phase jumps, which are small changes in phase, will occur.

A mathematical model for the receive only tuner circuit 14 was built using PI network tuning circuitry and an algorithm that was based on RSSI measurements conducted on a timeslot-by-timeslot basis in TDD. The RSSI measurements were used as input to the algorithm to select appropriate RX tuner setting values VC1 and VC2 for the capacitor C1 and the capacitor C2, respectively. The simulation assumed that each tuner setting value had a resolution of six bits.

A 0.5 dB insertion loss (IL) between the antenna and the RX tuner was considered. The 0.5 dB IL accounts for a printed circuit board (PCB) and wire-bond along with the T/R switch 12 IL prior to the antenna 50. A 1 nH of inductance between the antenna 50 and the receive only tuner circuit 14 was also considered. The RX frequency simulated was 1910 MHz, which is a frequency used in LTE-TDD bands. The RX tuner model did not include the IL of the receive only tuner circuit 14 for simplicity. However, a simulation model will provide accurate results regarding the IL of the receive only tuner circuit 14 based on the SOI technology used to fabricate the receive only tuner circuit 14. The VSWR of the antenna 50 was assumed to be changing over time as a sinusoidal function.

Figure 8:
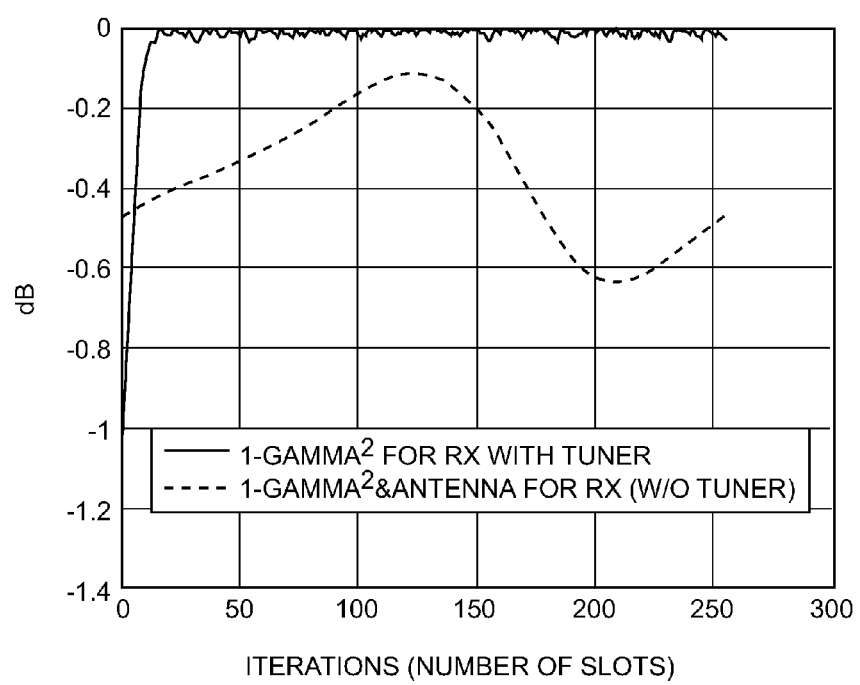
FIG. 8 is a graph of tuner gain in dB versus gamma$^2$ for a receiver with the receive only tuner circuit and gamma$^2$ and antenna for a receiver without the receive only tuner circuit.

FIG. 8 shows an output from the simulation that demonstrates the improved receiver sensitivity versus iterations without the receive only tuner circuit 14 for a corresponding change in VSWR at the antenna 50 over time. Each iteration point corresponds to a timeslot duration. FIG. 8 also shows how an RX tuner algorithm is capable of tracking the VSWR changes over time.

Figure 9:
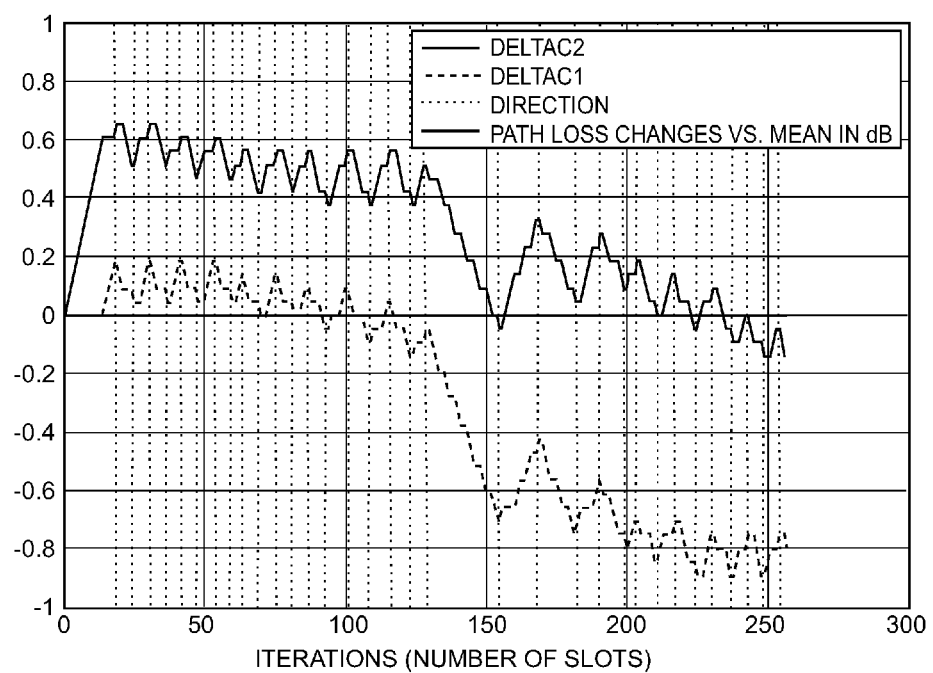
FIG. 9 is a graph showing changes for the tuning capacitors C1 and C2 along with direction values for a fixed path.
Figure 10:
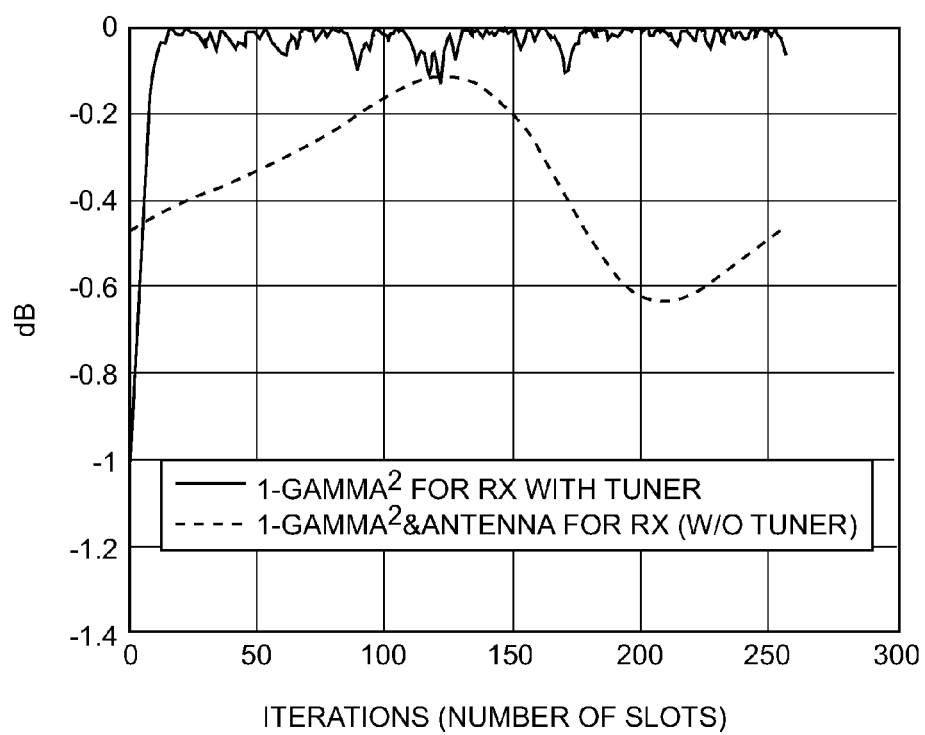
FIG. 10 is a graph showing a power loss due to voltage standing wave ratio (VSWR) changes with and without the receive only tuner circuit.
Figure 11:
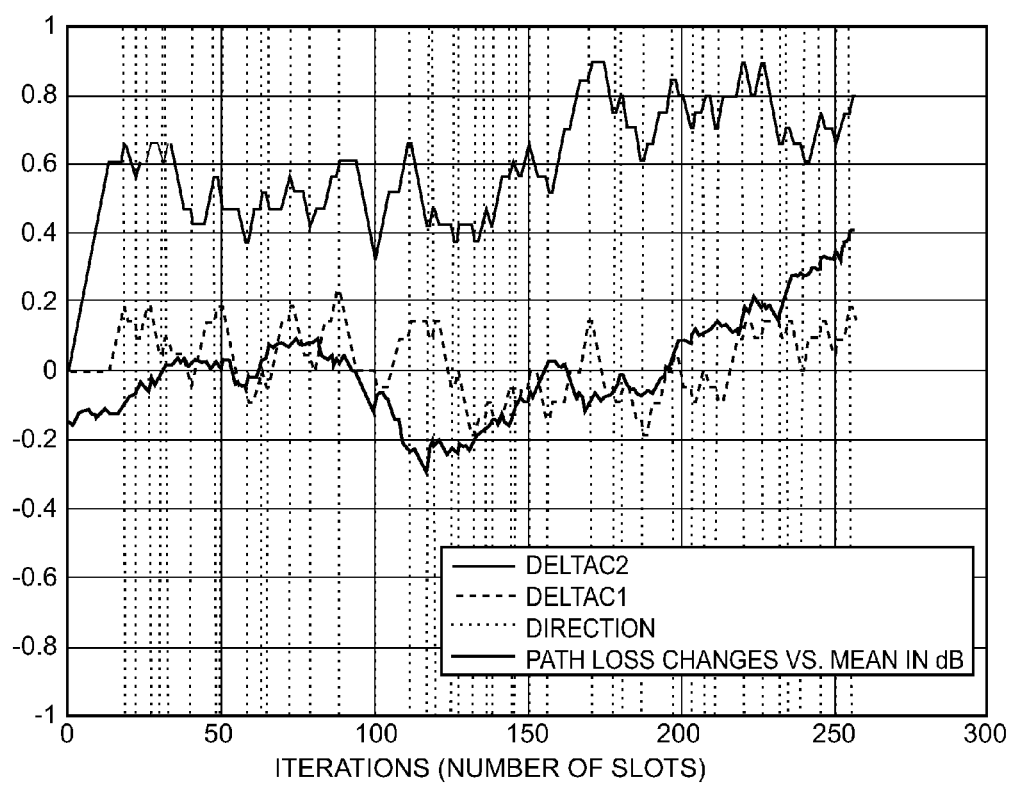
FIG. 11 is a graph of DeltaC1 and DeltaC2 along with direction values for a random variable path loss of +−0.3 dB.

FIG. 9 illustrates the change of capacitor VC1 and VC2 values by a change in capacitance for the capacitor C1 (i.e., DeltaC1) and a change in capacitance for the capacitor C2 (i.e., DeltaC2), and by the direction, which indicates the sign of DeltaC1 and DeltaC2. A direction of +1 corresponds to an increase of VC1 or VC2 value and direction of −1 corresponds to decrease of VC2 or VC2 value. The simulation was done assuming a fixed path loss between a base station (NodeB) and the mobile terminal. If the path loss between NodeB and the mobile terminal is changing over time randomly, the algorithm still converges, as shown in FIGS. 10 and 11.

Figure 12:
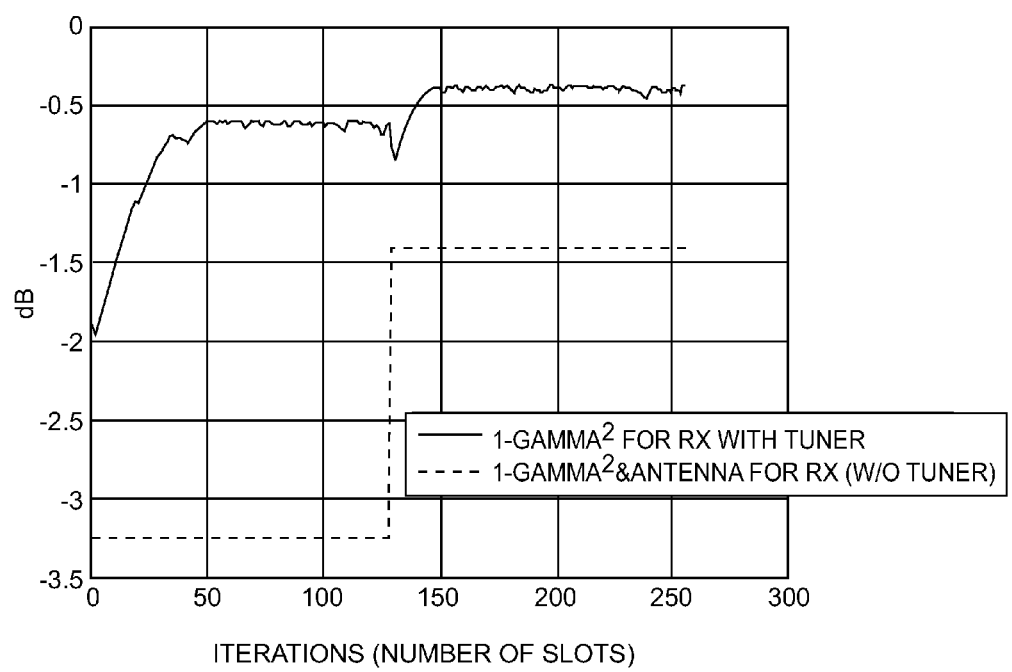
FIG. 12 is a graph of power loss due to VSWR by simulating a step change in VSWR.

In a simulation illustrated in FIG. 12, a non-realistic step change in VSWR is shown between two VSWR values. Nevertheless, the simulation illustrated in FIG. 12 shows the correction range capability of the receive only tuner circuit 14.

Figure 13:
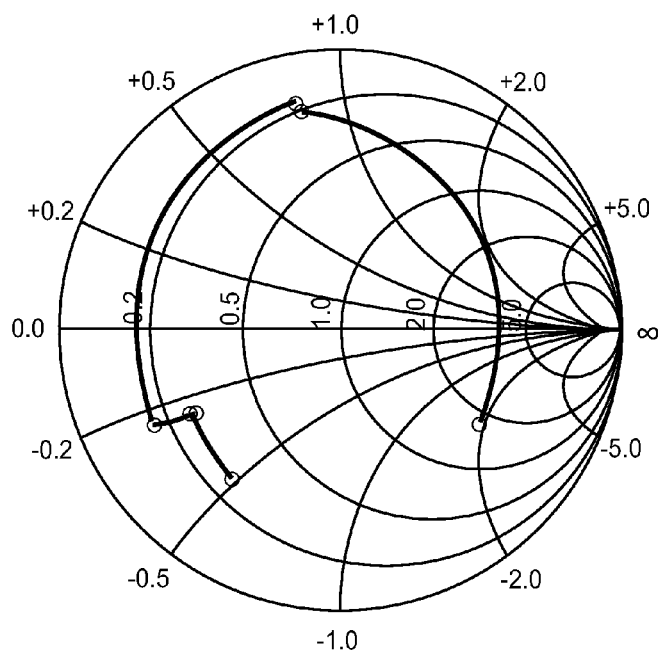
FIG. 13 is the Smith chart for the receive only tuner circuit at the beginning of a tuning algorithm and after several tuning adjustments.
Figure 14:
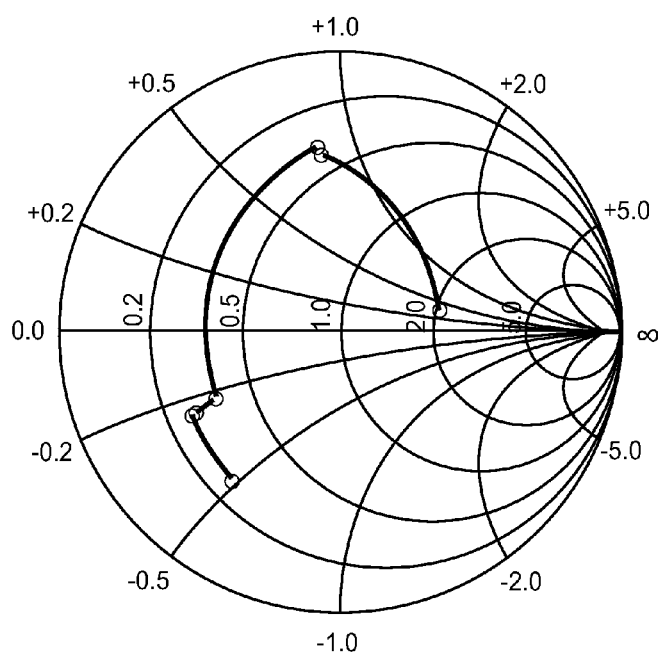
FIG. 14 is the Smith chart for the receive only tuner circuit by the end of the tuning algorithm.

FIG. 13 is the Smith chart for the receive only tuner circuit 14 at the beginning of the algorithm and after several tuning adjustments. FIG. 14 is the Smith chart for the receive only tuner circuit 14 by the ending of the algorithm. Both FIG. 13 and FIG. 14 depict plotted algorithm output data beginning at an input node of the antenna 50 and ending at an output node of the receive only tuner circuit 14.

As outlined above, the present invention enables but is not limited to the following:
  A T/R switch combined with a receiver only tuner circuitry located on the RX throw of the switch;
  Wherein the system is used for half-duplex or TDD systems
  Wherein LTE-TDD is used;
  Wherein the receiver only tuner circuitry reuse the same circuitry overhead like driver stages and controller as the transmit/receive switch;
  Wherein the receiver only tuner use a capacitor switch array tuning element; and
  Wherein a single GPIO is used to sequence the settings of the receiver tuner.

The programming interface for the T/R switch 12 with the combined receive only tuner circuit 14 can be customized if needed depending on the transceiver interface 30. For example, a three-wire Serial Data Interface (SDI) can be considered, or a two-wire Mobile Industry Processor Interface (MIPI) interface can be considered. The design and specification for the programming interface is thus left to the individual designer.

However, for an SOI die that includes the ATU 10, a single GPIO programming interface may be used for the receive only tuner circuit 14 to enable a flexibility to interface with transceivers that do not have an SDI or Radio Frequency Front End (RFFE) MIPI interface. In addition to this, the SOI die may be used in military application products where no serial SDI interface is available, thus a simple single GPIO programming interface may be utilized as outlined below.

Figure 15:
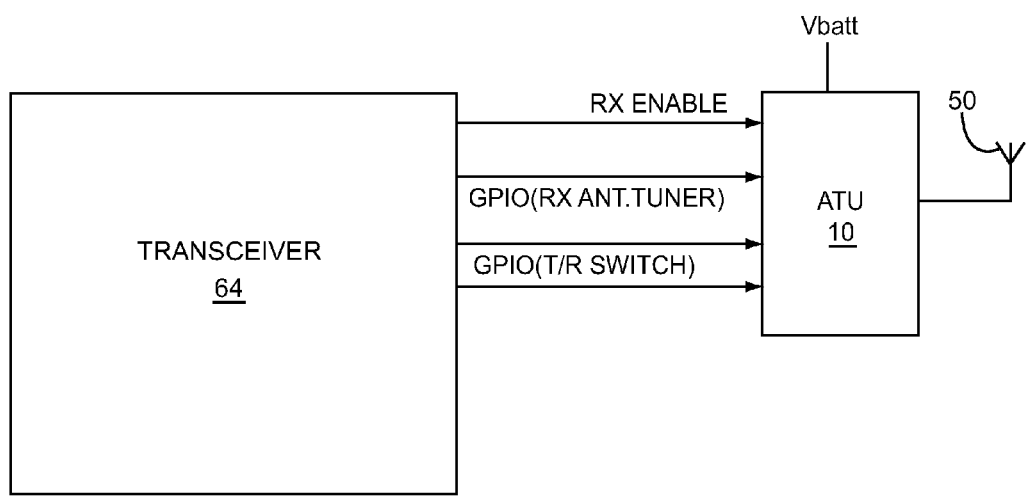
FIG. 15 depicts the receive only tuner circuit with a one-wire GPIO control and the T/R switch with two-wire GPIO control.

As illustrated in FIG. 15, a transceiver 64 communicates with the ATU 10 via a one-wire signal GPIO(RX ANT. TUNER) to select capacitor values for the receive only tuner 14 (FIG. 1). A signal RX ENABLE enables the voltage regulator 22 (FIG. 1) in order to turn the ATU on and off. A two-wire signal GPIO(T/R SWITCH) communicates with the ATU 10 to select switch positions for the T/R switch 12 (FIG. 1).

Figure 16:
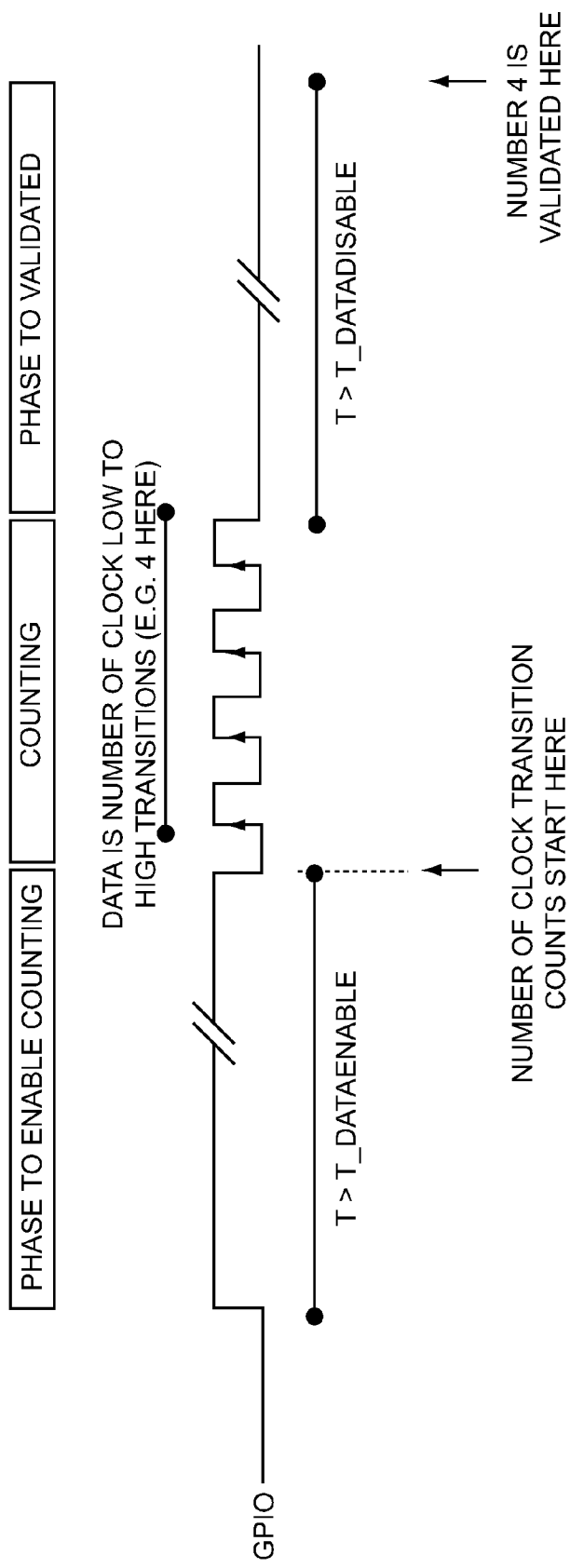
FIG. 16 is a timing diagram depicting a GPIO control sequence to program the receive only tuner circuit.

FIG. 16 illustrates a programming sequence using the one-wire signal GPIO(RX ANT. TUNER) to program the receive only tuner circuit 14 (FIG. 1) of the ATU 10. The one-wire signal GPIO(RX ANT. TUNER) for the receive only tuner circuit 14 is set to 1 for a duration T>T_dataenable such that an internal current source charges an internal capacitor. When the voltage across the internal capacitor exceeds a threshold indicating that programming is enabled, the one-wire signal GPIO(RX ANT. TUNER) is toggled to create a certain number of transitions whose count is equivalent to the value to be programmed. Next, the one-wire signal GPIO(RX ANT. TUNER) is set to 0 for a duration T>T_datadisable such the voltage across the capacitor is discharged. When the voltage is below a threshold indicating the end of the transmission and validating, the programming is stopped until a next new GPIO sequence.

The ATU 10 contains a plurality of registers (not shown). A first GPIO sequence is processed to select one of the plurality of registers and the second GPIO sequence is processed to program a value into the selected one of the plurality of registers. The first GPIO sequence is as follows:
  Transition count values are programmed from #01d to #08d, but are always less than 8 counts, which indicate that a specific register is being addressed rather than the content of the specific register. The content of the specific register will be programmed on the next sequence.
  e.g. #01d means the C1 capacitor-array will be programmed
  e.g. #02d means the C2 capacitor-array will be programmed
  e.g. #03d means the C1 capacitor-array will be directly incremented by one least significant bit (+1 LSB)
  e.g. #04d means the C1 capacitor-array will be directly decremented by +1LSB
  e.g. #05d means the C2 capacitor-array will be directly incremented by +1LSB
  e.g. #06d means the C2 capacitor-array will be directly decremented by +1LSB
  (#07d, and #08d are reserved)

The second GPIO sequence programs count values that are >8, where the number of transitions sent in the counting period are 8+Data, Data being the data to be programmed in the selected register (enabled in the first GPIO sequence that has less than 8 transitions), i.e. the GPIO will toggle for 8+Data transitions during the counting period.

Figure 17:
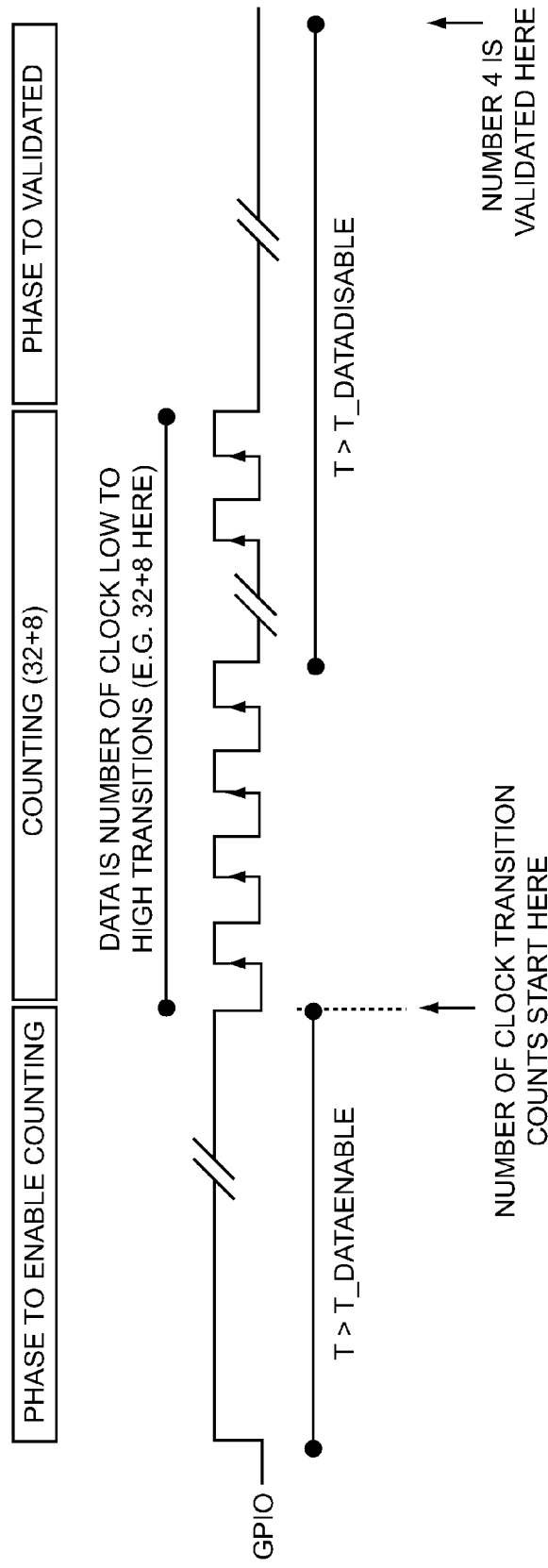
FIG. 17 is a timing diagram depicting a second GPIO control sequence to program the contents of a selected register.

For example, if a value of #32d is to be programmed for the cap array, this will result in a GPIO sequence that creates 8+32 clock transitions during the counting phase as shown in FIG. 17, the fact it is always higher than 8 indicates that a value is being programmed rather than addressing a specific register, and inside RX tuner circuitry, internally a fixed offset of 8 will be subtracted to extract the data value.

Figure 18:
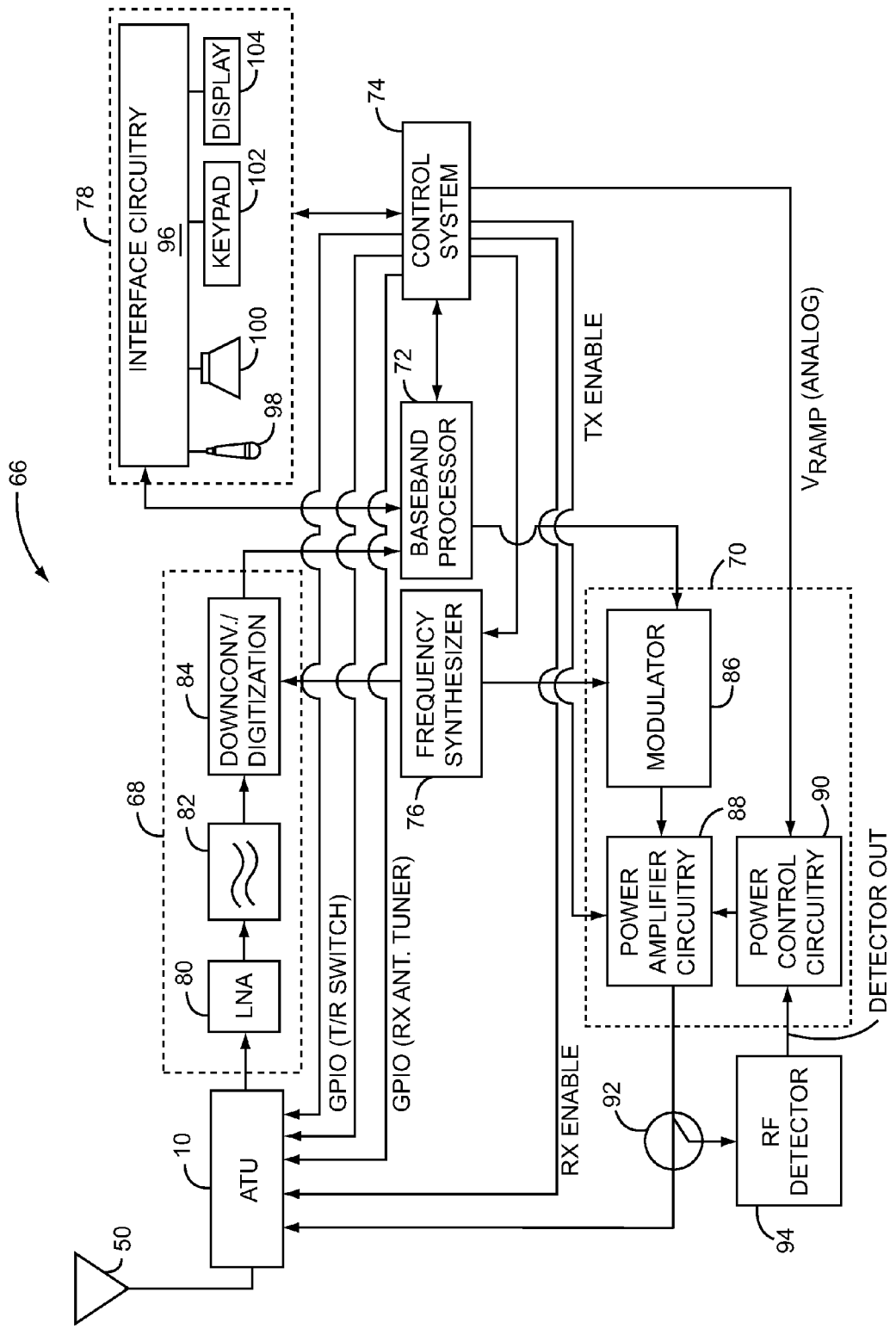
FIG. 18 is a block diagram of a mobile terminal that includes an ATU having a T/R switch integrated with the receive only tuner circuit according to the present disclosure.

The ATU 10 of the present disclosure is preferably incorporated in a mobile terminal 66, such as a mobile telephone, personal digital assistant (PDA), personal computer, or the like. The basic architecture of the mobile terminal 66 is represented in FIG. 18, and may include a receiver front end 68, an RF transmitter section 70, the antenna 50, the ATU 10, a baseband processor 72, a control system 74, a frequency synthesizer 76, and an interface 78.

The receiver front end 68 receives information bearing RF signals from one or more remote transmitters provided by a base station (not shown). The ATU 10 tunes the antenna 50 to enhance the reception of an RF signal captured by the antenna 50. A low noise amplifier 80 amplifies the RF signal. A filter circuit 82 minimizes broadband interference in the RF signal, while a downconverter 84 downconverts the filtered, received RF signal to an intermediate or baseband frequency signal, which is then digitized into one or more digital streams. The receiver front end 68 typically uses one or more mixing frequencies generated by the frequency synthesizer 76.

The baseband processor 72 processes the digitized received signal to extract the information or data bits conveyed in the received signal. This processing typically comprises demodulation, decoding, and error correction operations. As such, the baseband processor 72 is generally implemented in one or more digital signal processors (DSPs).

On the transmit side, the baseband processor 72 receives digitized data from the control system 74, which it encodes for transmission. The encoded data is output to the radio frequency transmitter section 70, where it is used by a modulator 86 to modulate a carrier signal that is at a desired transmit frequency. PA circuitry 88 amplifies the modulated carrier signal to a level appropriate for transmission from the antenna 50. The PA circuitry 88 provides gain for the signal to be transmitted under control of power control circuitry 90, which is preferably controlled by the control system 74 using an adjustable power control signal ($V_{RAMP}$). Further still, a directional coupler 92 samples output power from the PA circuitry 88 and provides a small sample of the output power to the RF detector 94, which in turn provides the DETECTOR OUT signal to the power control circuitry 90.

As a result of providing the DETECTOR OUT signal from the RF detector 94 to the power control circuitry 90, the bias for the PA circuitry 88 is adjusted to maintain a desired output power under varying conditions, such as decreasing battery voltage and/or fluctuating voltage standing wave ratio (VSWR), etc. The control system 74 may also provide a transmit enable signal (TX ENABLE) to effectively enable the PA circuitry 88 during periods of transmission.

A user may interact with the mobile terminal 66 via the interface 78, which may include interface circuitry 96 associated with a microphone 98, a speaker 100, a keypad 102, and a display 104. The interface circuitry 96 typically includes analog-to-digital converters, digital-to-analog converters, amplifiers, and the like. Additionally, the interface circuitry 96 may include a voice encoder/decoder, in which case it may communicate directly with the baseband processor 72.

The microphone 98 will typically convert audio input, such as the user's voice, into an electrical signal, which is then digitized and passed directly or indirectly to the baseband processor 72. Audio information encoded in the received signal is recovered by the baseband processor 72 and converted into an analog signal suitable for driving the speaker 100 and the interface circuitry 96. The keypad 102 and the display 104 enable the user to interact with the mobile terminal 66, inputting numbers to be dialed, address book information, or the like, as well as monitoring call progress information.

Those skilled in the art will recognize improvements and modifications to the preferred embodiments of the present disclosure. All such improvements and modifications are considered within the scope of the concepts disclosed herein and the claims that follow.

What is claimed is:

1. An antenna tuner unit (ATU) comprising:
    a transmit/receive (T/R) switch having a receive (RX) throw; and
    a receive only antenna tuner circuit having at least one tuning element integrated with the T/R switch on a die, wherein the receive only antenna tuner circuit is directly coupled to the RX throw of the T/R switch.

2. The ATU of claim 1, wherein the receive only antenna tuner circuit is adapted to operate in a half-duplex communications system.

3. The ATU of claim 1, wherein the receive only antenna tuner circuit is adapted to receive signals from a time division duplex (TDD) communications system.

4. The ATU of claim 1, wherein the receive only antenna tuner circuit is adapted to receive signals transmitted from a long term evolution time division duplex (LTE-TDD) communications system.

5. The ATU of claim 1, wherein the receive only antenna tuner circuit is adapted to share a controller with the T/R switch.

6. The ATU of claim 1, wherein the at least one tuning element of the receive only antenna tuner circuit includes a switchable capacitor-array for tuning an antenna that is communicatively coupled to the receive only antenna tuner circuit.

7. The ATU of claim 6, wherein the switchable capacitor-array is a binary segmented capacitor-array.

8. The ATU of claim 6, wherein the switchable capacitor-array is controllable via a general purpose input output (GPIO) that is communicatively coupled to an external controller.

9. The ATU of claim 8, wherein the GPIO is adapted to send commands to the switchable capacitor-array via one-wire.

10. The ATU of claim 1, wherein the receive only antenna tuner circuit and the T/R switch are integrated using a silicon-on-insulator fabrication process.

11. A mobile terminal comprising:
    at least one antenna;
    an antenna tuner unit (ATU) comprising;
        a transmit/receive (T/R) switch having a receive (RX) throw communicatively coupled to the at least one antenna;
        a receive only antenna tuner circuit having at least one tuning element integrated with the T/R switch on a die, the receive only antenna tuner circuit being directly coupled to the RX throw of the T/R switch, wherein the at least one tuning element is programmable tuning element; and
    a controller adapted to program the at least one tuning element.

12. The mobile terminal of claim 11, wherein the receive only antenna tuner circuit is adapted to operate in a half-duplex communications system.

13. The mobile terminal of claim 11, wherein the receive only antenna tuner circuit is adapted to receive signals from a TDD communications system.

14. The mobile terminal of claim 11, wherein the receive only antenna tuner circuit is adapted to receive signals transmitted from a LTE-TDD communications system.

15. The mobile terminal of claim 11, wherein the receive only antenna tuner circuit is adapted to share the controller with the T/R switch.

16. The mobile terminal of claim 11, wherein the at least one tuning element is a switchable capacitor-array for tuning the at least one antenna that is communicatively coupled to the receive only antenna tuner circuit.

17. The mobile terminal of claim 16, wherein the switchable capacitor-array is a binary segmented capacitor-array.

18. The mobile terminal of claim 16, wherein the switchable capacitor-array is controllable via a GPIO that is communicatively coupled to the controller.

19. The mobile terminal of claim 18, wherein the GPIO is adapted to send commands to the switchable capacitor-array via one-wire.

20. The mobile terminal of claim 11, wherein the receive only antenna tuner circuit and the T/R switch are integrated using a silicon-on-insulator fabrication process.

21. A diversity antenna system comprising:
    a diversity receive antenna;
    a transmit and receive (T/R) antenna; and an antenna tuner unit (ATU) comprising:
  a receive only switch having a receive (RX) throw; and
  a receive only antenna tuner circuit having at least one tuning element integrated with the receive only switch on a die, the receive only switch being directly coupled to the RX throw, wherein the receive only antenna tuner circuit is communicatively coupled to the diversity receive antenna through the receive only switch.

22. The diversity antenna system of claim 21, wherein the diversity receive antenna is adapted to receive signals from a multiple-input and multiple-output (MIMO) system.

23. The diversity antenna system of claim 21, wherein the receive only antenna tuner circuit is adapted to operate in a half-duplex communications system.

24. The diversity antenna system of claim 21, wherein the receive only antenna tuner circuit is adapted to receive signals from a time division duplex (TDD) communications system.

25. The diversity antenna system of claim 21, wherein the receive only antenna tuner circuit is adapted to receive signals transmitted from a long term evolution time division duplex (LTE-TDD) communications system.

26. The diversity antenna system of claim 21, wherein the receive only antenna tuner circuit is adapted to share a controller with the receive only switch.

27. The diversity antenna system of claim 21, wherein the at least one tuning element of the receive only antenna tuner circuit includes a switchable capacitor-array for tuning an antenna that is communicatively coupled to the receive only antenna tuner circuit.

28. The diversity antenna system of claim 27, wherein the switchable capacitor-array is a binary segmented capacitor-array.

29. The diversity antenna system of claim 27, wherein the switchable capacitor-array is controllable via a general purpose input output (GPIO) that is communicatively coupled to an external controller.

30. The diversity antenna system of claim 29, wherein the GPIO is adapted to send commands to the switchable capacitor-array via one-wire.

31. The diversity antenna system of claim 21, wherein the receive only antenna tuner circuit and the receive only switch are integrated using a silicon-on-insulator fabrication process.

32. A transceiver interface comprising:
an antenna; and
an antenna tuner unit (ATU) comprising:
  a transmit and receive (T/R) switch having a receive (RX) throw; and
  a receive only antenna tuner circuit having at least one tuning element integrated with the T/R switch on a die, the receive only antenna tuner circuit being directly coupled to the RX throw, wherein the receive only antenna tuner circuit is communicatively coupled to the antenna through the T/R switch.

33. The transceiver interface of claim 32, wherein the receive only antenna tuner circuit is adapted to operate in a half-duplex communications system.

34. The transceiver interface of claim 32, wherein the receive only antenna tuner circuit is adapted to receive signals from a time division duplex (TDD) communications system.

35. The transceiver interface of claim 32, wherein the receive only antenna tuner circuit is adapted to receive signals transmitted from a long term evolution time division duplex (LTE-TDD) communications system.

36. The transceiver interface of claim 32, wherein the receive only antenna tuner circuit is adapted to share a controller with the T/R switch.

37. The transceiver interface of claim 32, wherein at least one tuning element of the receive only antenna tuner circuit includes a switchable capacitor-array for tuning an antenna that is communicatively coupled to the receive only antenna tuner circuit.

38. The transceiver interface of claim 37, wherein the switchable capacitor-array is a binary segmented capacitor-array.

39. The transceiver interface of claim 37, wherein the switchable capacitor-array is controllable via a general purpose input output (GPIO) that is communicatively coupled to an external controller.

40. The transceiver interface of claim 39, wherein the GPIO is adapted to send commands to the switchable capacitor-array via one-wire.

41. The transceiver interface of claim 32, wherein the receive only antenna tuner circuit and the T/R switch are integrated using a silicon-on-insulator fabrication process.

* * * * *

UNITED STATES PATENT AND TRADEMARK OFFICE
CERTIFICATE OF CORRECTION

PATENT NO. : 8,787,215 B1  
APPLICATION NO. : 12/900056  
DATED : July 22, 2014  
INVENTOR(S) : Nadim Khlat et al.

Page 1 of 1

It is certified that error appears in the above-identified patent and that said Letters Patent is hereby corrected as shown below:

In the Specification

In column 7, at line 7, replace "VC2 or VC2 value" with --VC1 or VC2 value--.

In the Claims

In claim 11, in column 10, at lines 34-35, replace "programmable tuning element;" with --programmable;--.

Signed and Sealed this
Twenty-eighth Day of October, 2014

Michelle K. Lee
*Deputy Director of the United States Patent and Trademark Office*